(12) United States Patent
Smith

(10) Patent No.: US 7,584,570 B2
(45) Date of Patent: *Sep. 8, 2009

(54) RETICLE FOR TELESCOPIC GUNSIGHT AND METHOD FOR USING CROSS REFERENCE TO RELATED APPLICATION

(75) Inventor: Thomas D. Smith, Oklahoma City, OK (US)

(73) Assignee: Thomas D. Smith, III, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/306,505

(22) Filed: Nov. 27, 2002

(65) Prior Publication Data

US 2005/0005495 A1     Jan. 13, 2005

Related U.S. Application Data

(63) Continuation of application No. 10/101,819, filed on Mar. 19, 2002, now Pat. No. 6,591,537, which is a continuation of application No. 09/152,320, filed on Sep. 14, 1998, now Pat. No. 6,357,158.

(51) Int. Cl.
*F41G 1/38* (2006.01)
(52) U.S. Cl. ........................................................ 42/122
(58) Field of Classification Search ................ 42/122, 42/123, 130, 131, 141
See application file for complete search history.

(56) References Cited

U.S. PATENT DOCUMENTS

| | | | |
|---|---|---|---|
| 1,708,389 A * | 4/1929 | Karnes | 89/41.22 |
| 3,392,450 A | 7/1968 | Herter et al | |
| 3,948,587 A * | 4/1976 | Rubbert | 356/21 |
| 4,263,719 A * | 4/1981 | Murdoch | 33/297 |
| 4,380,876 A * | 4/1983 | Strassburg | 33/297 |
| 4,806,007 A * | 2/1989 | Bindon | 359/424 |
| 5,181,323 A * | 1/1993 | Cooper | 42/122 |
| 5,223,650 A | 6/1993 | Finn | |
| 5,491,546 A * | 2/1996 | Wascher et al. | 356/4.03 |
| 5,920,995 A * | 7/1999 | Sammut | 42/122 |
| 5,949,015 A * | 9/1999 | Smith et al. | 89/41.05 |
| 6,032,374 A * | 3/2000 | Sammut | 42/122 |
| 6,591,537 B2 * | 7/2003 | Smith | 42/122 |

\* cited by examiner

*Primary Examiner*—Stephen M Johnson

(57) ABSTRACT

A gunsight reticle defines a system of dimensioned indicia spaced at specific separations to improve aiming accuracy of a gun. The indicia may include perpendicularly intersecting center vertical and center horizontal hairlines, and four (or more or less) horizontal range-marker lines disposed at specific angular separations below the horizontal hairline in bisected relationship with the center vertical hairline. Spacing of the range marker lines below the center horizontal hairline is proportional to bullet drop at selected ranges, depending upon ballistic characteristics of bullet used. Relative lengths of said range-marker bars on each side of the central vertical crosshair are proportional to a specific crosswind (say 10 mph) at target range reflected by respective range marker. The method involves employing this reticle to determine distance to target, and using distance thus determined to ascertain a precise aiming point on the reticle. These indicia also have other useful characteristics that allow the shooter to easily mentally calculate corrections for crosswind, moving targets and shooting at targets that are above or below the shooter at a significant angle.

3 Claims, 17 Drawing Sheets

Figure 12. The TDS TRI-FACTOR

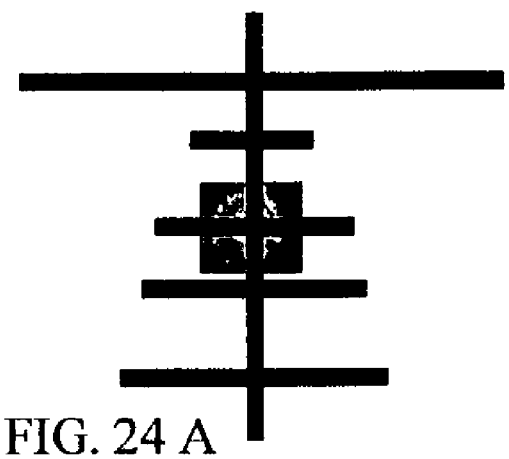
FIG. 24 A
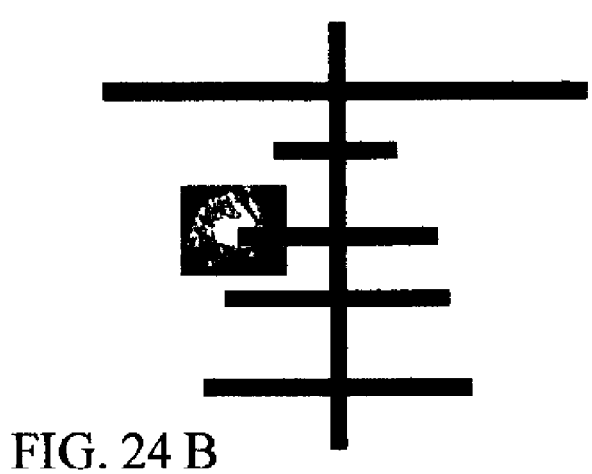
FIG. 24 B
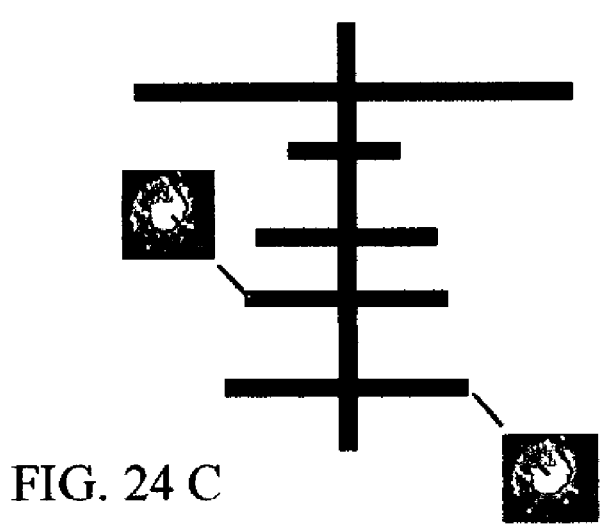
FIG. 24 C
FIGURE 24

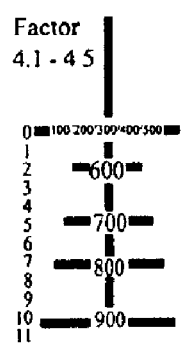
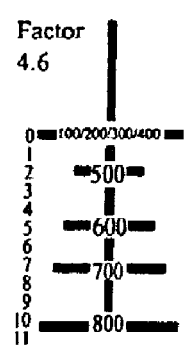
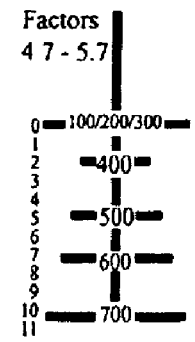
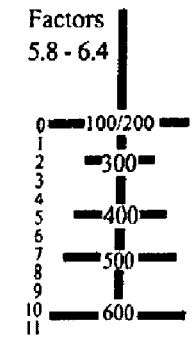
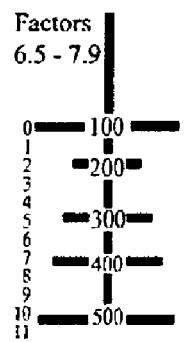
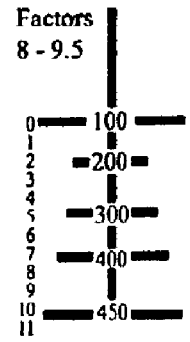
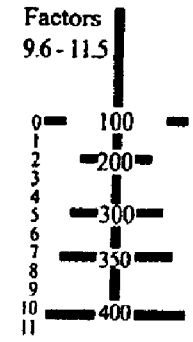
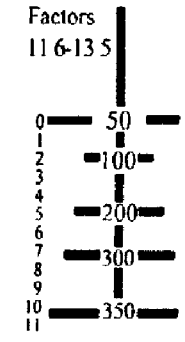
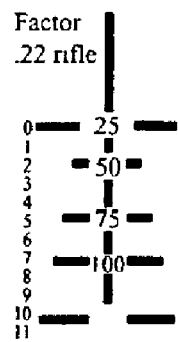
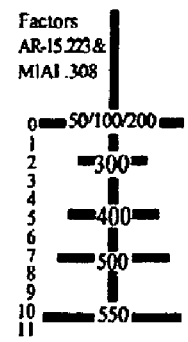
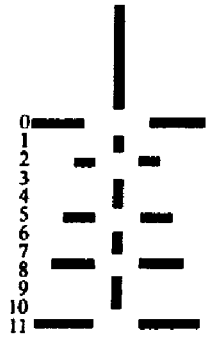
FIGURE 26

RETICLE FOR TELESCOPIC GUNSIGHT AND METHOD FOR USING CROSS REFERENCE TO RELATED APPLICATION

This application is a continuation of U.S. application Ser. No. 10/101,819 filed on Mar. 19, 2002, now U.S. Pat. No. 6,591,537, which is a continuation of U.S. application Ser. No. 09/152,320 filed on Sep. 14, 1998, now U.S. Pat. No. 6,357,158, all of which are incorporated herein by reference.

INCORPORATED BY REFERENCE

By Date

1. MALE MAGAZINE, Nov. 1967, Article page 11, "The Man who Refused To Die", the first dated reference to my Sniper Training.
2. The instruction manual then entitled "The PerfectShot" and currently named "The TDS TRI-FACTOR Mental Ballistics Calculator System" by Thomas D. Smith III, supplied herewith is hereby incorporated by reference in its entirety, including figures.
3. The Instruction manual entitled "Tactical Stress Management" by Thomas D. Smith III, supplied herewith is hereby incorporated by reference in its entirety, including figures.
4. Application Ser. No. 10/101,819, filed on Mar. 19, 2002, docket number TDS 2002-001 in its entirety. This document is on file with the USPTO.
5. The Instruction manual entitled "The TDS TRI-FACTOR Rifle Scope System" by Thomas D. Smith III, supplied herewith is hereby incorporated by reference in its entirety, including figures.
6. The Instruction manual entitled "The ADINO Combat Rifle Scope System" by Thomas D. Smith III, supplied herewith is hereby incorporated by reference in its entirety, including figures.

BACKGROUND OF THE INVENTION

1. Field of Invention

This invention relates to telescopic and other optical sighting systems for use on guns and other projectile delivering systems of all types but will herein it will be described as primarily applied to telescopic sights on typical rifles. More particularly, this invention relates most naturally to a telescopic gunsight equipped with a transparent aiming reticle and a method for using that reticle on a gun but it is certainly not constrained to that specific application.

2. Description of Prior Art

It is well known that the line of sight between a shooter's eye and a target is a straight line, whether using "iron" sights or a telescopic sight, while the trajectory of the projectile is never a straight line (when passing though a gravitational field, the trajectory follows a ballistic parabola), which becomes of particular importance for projectile flights covering long distances. Accordingly, in order to achieve sufficiently accurate shot placement, it is essential either to "sight in" the rifle (or other projectile delivering system: hereafter "gun") to produce the projectile (hereafter, bullet) to the desired aiming point at a specific fixed target distance or to know both the distance from the gun to the target and the trajectory characteristics of the bullet used. Trajectory characteristics for commercial bullets are related to initial launch velocity and are known or are easily obtained from either the manufacturer or from trajectory charts such as INGALLS' tables.

Telescopic gunsights, often referred to as "scopes," generally contain a transparent flat disk reticle positioned in a plane perpendicular to the line of sight through the scope. The reticle conventionally has a single vertical crosshair (or hairline) and a single horizontal crosshair (or hairline), which intersects the vertical hairline near the visual center of the reticle and the scope. The point of intersection of these crosshairs constitutes the primary sighting point for the scope, representing site of bullet impact at a chosen (zero) distance.

In modern scopes, the gunsight is most commonly moveable in vertical and horizontal directions by way of calibrated adjustment screws located on the scope exterior (internal adjustments); in some older and a few newer and new scopes, the gunsight is adjusted by devices within the scope attachment system (external adjustments). Method of adjustment has no significant influence upon reticle design or use.

By firing one or more shots and making compensatory adjustments of the relative position of the reticle center point, the shooting system, which is comprised of rifle, bullet type and velocity, scope and shooter is "zeroed in" so that aiming position of the reticle crossed hairlines or reticle center point coincides with point of bullet impact on the target.

In certain scope sighting systems, the reticle has a series of evenly-spaced secondary horizontal hairlines that intersect the vertical hairline below the center horizontal hairline. In those systems, the respective points of intersection of the secondary hairlines with the vertical hairline are typically used to estimate bullet impact points at distances progressively greater than that at which the rifle was "zeroed in" with the main (center) horizontal crosshair. However, in order to utilize these secondary horizontal crosshairs with accurate and predictable results, the shooter must know distance from gun to target with a significant degree of precision.

Various types of range finder systems have been disclosed for telescopic gunsights. For example, U.S. Pat. No. 1,190,121 to Critchett discloses a reticle having a series of target-spanning rulings disposed above a baseline, the rulings corresponding to associated shooting distances. In use, the shooter ascertains which ruling above the baseline makes the most closely embracing fit on the target, thereby determining the shooting distance (target range). A separate crosshair aiming point is included in the reticle for use in association with each chosen ruling above the baseline.

The principle of the Critchett target-spanning rulings is that certain targets are of known, or at least estimable size. For instance, it is a fairly accurate estimate that for mature deer or antelope, the distance between the top of the back at the shoulders and the bottom of the chest cavity is about 18 inches. The target-spanning rulings are spaced apart such as to span a known target size at a known range. This manner of distance measurement is consistent with conventional trigonometric considerations wherein the triangle defined by the height of the target and the viewing angle through the telescope's optical system can be considered a right triangle, which accordingly establishes the length of the base line distance to the distal side of the triangle, namely the distance to the target.

U.S. Pat. No. 3,392,450 to Herter et. al. discloses a reticle having a series of target-spanning circles of different diameters which correspond to associated shooting distances. Employing the same basic distance-measuring concept as Critchett, the shooter employs for aiming purposes, that crosshair which corresponds to the selected circle.

U.S. Pat. No. 3,190,003 to O'Brien concerns a range-finding reticle for a telescopic gunsight having single centered vertical and horizontal hairlines. The portion of the vertical hairline below the horizontal centerline is provided with widened bar regions extending various lengths below the centerline. Each bar subtends a target of known size. By finding which widened region corresponds to the height of the target, the shooting distance is estimated.

U.S. Pat. No. 3,431,652 to Leatherwood discloses a telescopic gunsight wherein the distance to the target is determined by movement of upper and lower horizontal hairlines along a fixed vertical hairline in a manner so as to bracket the target. Once bracketed, the intersection of the lower horizontal hairline with the vertical hairline serves as the crosshair aiming point. In this aiming process, the alignment of the scope changes with respect to the gun barrel, whereby the allowance for distance is achieved when the centered crosshair is sighted directly on the target.

U.S. Pat. No. 3,492,733 to Leatherwood discloses a distance measuring system for a variable power telescopic sight that is pivotally moveable in a vertical plane with respect to the gun barrel upon which it is mounted. Cams within the scope and rotatable by external means achieve vertical movement of the scope so that horizontal framing hairlines will fit the target. A specialized cam must be installed into the scope for each particular type of ammunition employed.

U.S. Pat. No. 3,948,587 to Rubbert concerns a variable power telescopic sight having a reticle provided with a vertical hairline, a center horizontal hairline and three horizontal framing lines disposed below the center horizontal hairline. Aiming is achieved by positioning either the center crosshair or lower crosshairs on the target, as dictated by the observed fit of the target within the framing lines.

U.S. Pat. No. 4,403,421 to Shepherd discloses a telescopic gunsight having spaced apart primary and secondary reticles which are moveable relative to each other. The secondary reticle is also moveable vertically and horizontally within the plane of the reticle. The moveable two reticle system facilitates adjustments for windage and elevation. Distance to the target is ascertained by framing indicia on the secondary reticle.

The telescopic sights disclosed in the aforementioned prior art patents are often of limited usefulness insofar as they do not address many of the several factors that need to be considered in the accurate aiming of a rifle under field conditions. Such factors include:
a) distance to target
b) drop of bullet caused by force of gravity
c) hold-over or hold-under aiming points
d) wind drift correction
e) correction for phenomenon associated with gyroscopic forces on a gyroscopically stabilized bullet (sometimes referred to as)
   1) Yaw of Repose effects (vertical displacements)
   2) Magnus effects (horizontal displacements)

These latter result from the effect of cross-wind or shooting either up-hill or down-hill.

Older reticle systems often require that the shooter look away from the target in order to make compensating adjustments and almost always require complicated mental or physical manipulations. Some of these designs may render the scopes difficult or slow to use, and some require moveable mounting on the rifle, a situation which typically subjects the scope to inaccuracy after repeated use or abuse in rugged field conditions. Moreover, correct use of any of these systems always requires the shooter to manage extraordinary mental work in what can already be a stressful situation. It is proven that such additional stress is associated with decreased performance potential.

SUMMARY OF THE INVENTION

The present invention is embodied in a reticle design concept for a gunsight and "sticker" system. By firing shots to perform a simple drop test, the shooter can know which sticker to choose in order to automatically calibrate this reticle to measure distance to any size target, to provide precise drop compensation aiming points for specific measured ranges beyond the normal point-blank (zero) range for any bullet, to automatically provide precise aiming points compensating for cross-winds and up-hill or down-hill shooting conditions, and to provide an accurate lead point aiming corrections for moving targets, thereby providing an accurate and effective method for aiming the rifle, all with relatively simple and fast mental work that does not require extraordinary effort by the shooter or any knowledge of the particular ballistic characteristics of load or gun to which this system is applied.

It is critical to note that the TDS system combines three critical factors:
1) specially designed reticle;
2) specially designed stickers (durable visual keys intended to be attached to the gun);
3) test firing to prove required sticker for the system and use.

The telescopic sighting system incorporates an optical system comprised of a forward objective lens element, a rear eyepiece lens element and intervening erector lens element, the elements being protectively confined within an elongated tubular housing adapted to be affixed to a firearm, such as a hunting rifle (but not restricted to such use and application—with proper adjustments, this system can just as well be applied to the sighting system on a bow, handgun, artillery piece, airplane or other instrument). The improvement provided by the present invention comprises addition into said optical system within said housing of a transparent reticle having indicia which simultaneously provides accurately both the function of distance measuring, range-specific aiming as well as wind related and other trajectory corrections. The reticle is positioned between the objective lens element and the erector lens element. The indicia incorporates orthogonally intersecting center vertical and horizontal hairlines, and four (or more or less) horizontal combination range-marker and wind bar lines, which are disposed below the center horizontal hairline with very specific vertical spacings and intersecting in a bisected relation the center vertical hairline.

Note that other carrier systems and other specific designs for any means of achieving the same aiming goals through the same basic functionality, which is derived from recognition of the parabolic nature of a projectile trajectory, are envisioned and are specifically recognized and claimed as intellectually and functionally similar and therefore also protected by this application.

The specific and precise configuration and positioning of the range marker and wind bar lines enables the shooter to mentally compute the range to the target and allow for bullet drop, wind drift, gyroscopic effects, up-hill or down-hill angle shots and target lead. With modest practice, a typical shooter can learn to accomplish these tasks within in a split-second. The specific ratio of the spacings of these secondary indicia is critical to the functionality of this system. The accuracy achieved by this reticle promotes shooter confidence which in turn leads to shooter proficiency. Similarly, the simplicity of the basic member of this system, as described herein, leads to simplicity of precise application.

This system can also include range marker bars that intersect the vertical axis at a slight angle. The purpose of this characteristic is to automatically correct for the elevation component of wind drift. It is a recognized fact that crosswinds do cause bullets to raise or drop relative to the trajectory that would occur without a crosswind. This characteristic is not described in the drawings but is a recognized potential feature that can have significant value in specific applications, such as airplane and artillery sights, but is not limited to such applications.

The basic reason that this system works relates to the following facts. First, all projectiles fired in the gravitational field and atmosphere of the Earth travel in a parabolic trajectory. Shape of the curve described by this trajectory depends upon angle of fire (with respect to the horizontal), atmospheric conditions and gravitational factors, projectile exit velocity and the ballistic efficiency of the projectile (which is described as ballistic coefficient, or BC, for bullets). It is a fact that to a reasonable approximation, all such curves contain a section near the beginning (within the typical useful range of any projectile launching device) that is shaped very similar to a similar a like section from any other trajectory curve. By applying an expansion in the longitudinal direction and possibly a rotation about the vertical and horizontal axis to the curve represented by the slower projectile, to a first approximation (and close enough for practical purposes), such sections of the two curves will follow indistinguishable paths. Refer to FIG. 12.

BRIEF DESCRIPTION OF THE DRAWINGS

FIG. 12 illustrates the fundamental reason that this system works: Sections of significantly different trajectories forced into relative correspondence through the simple expedient of rotation and horizontal scaling.

FIG. 12 (Rotation and horizontal scaling yields similar sections for all trajectory curves)

FIGS. 24A-24C illustrate correction for cross wind phenomena which result in both vertical and horizontal displacement of a bullet.

FIG. 26 illustrates reticle decals for varying TDS Tri-Factors.

DESCRIPTION OF PREFERRED EMBODIMENT (For The Purposes of Clarification Only)

Figure 1:
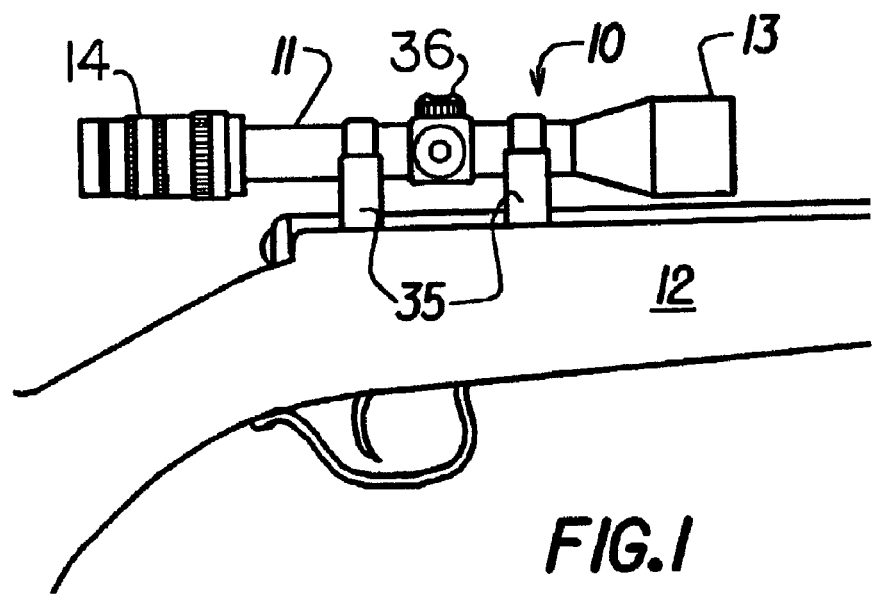
FIG. 1 is a side elevation view of a telescopic sight embodying the preferred type of the present invention mounted upon a gun of the type commonly used for hunting, target shooting and related practices.
Figure 1A:
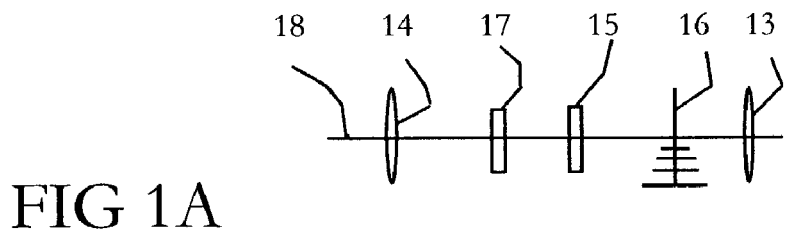
FIG. 1A is a schematic illustration of the internal components of a telescopic sight wherein the reticle is positioned between the objective lens element and the erector lens element.
Figure 2:
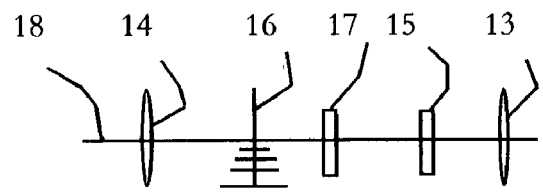
FIG. 2 is a schematic illustration of the internal components of a variable power telescopic sight of the type shown in FIG. 1.
Figure 3:
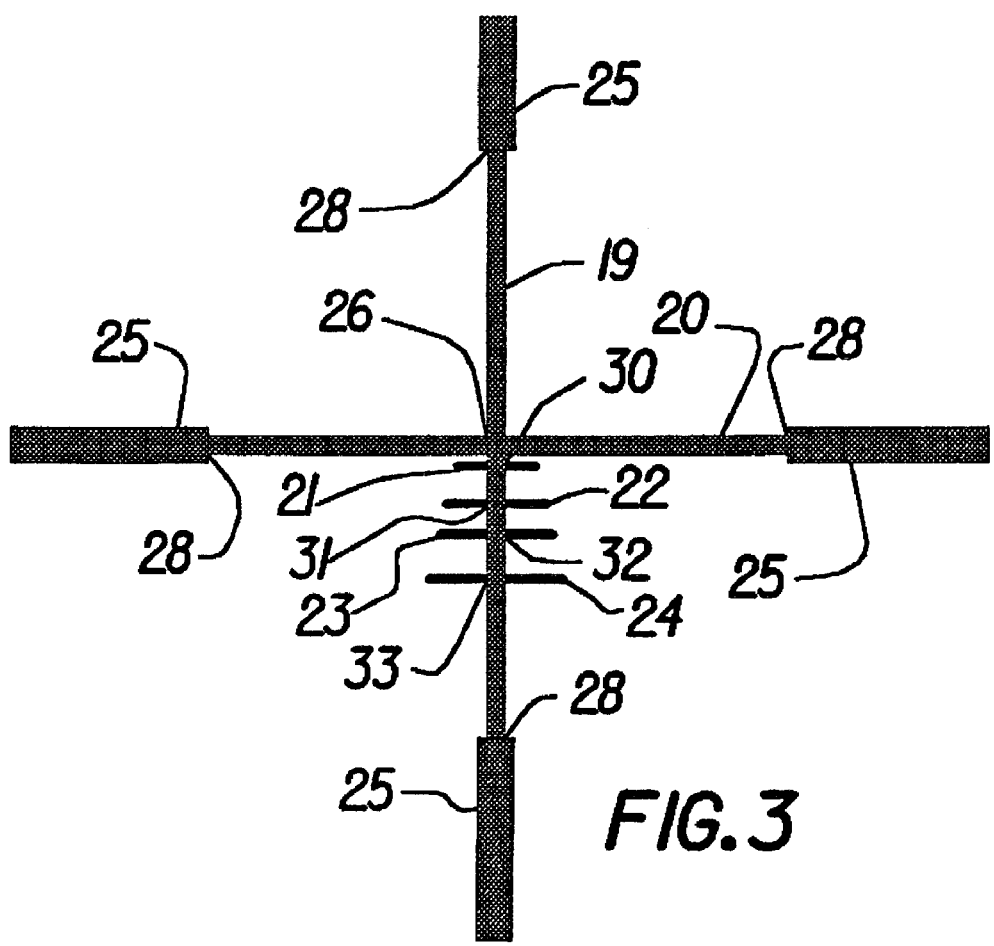
FIG. 3 is an enlarged view showing an aiming reticle component of the sight of FIG. 1 as it appears to the user of the sight.

Referring to FIGS. 1-3, a telescopic sight 10, embodying this invention is shown attached by a suitable mount 35 to a gun 12. The sight 10 is formed by a tubular housing 11 containing a forwardly positioned objective lens element 13, a rearwardly positioned ocular or eyepiece lens element 14, an intervening erector lens element 15, and a reticle 16 disposed between the objective lens element 13 and the erector lens element 15. In the case of vari-focal or zoom scopes, a positionally adjustable magnifying lens 17 is associated with the erector lens element 15. The exterior of the housing 11 may be equipped with rotationally moveable features 36 for adjusting focus, parallax, magnification ratio, windage and elevation. Each of the various lens elements may be single lenses or combinations of lenses, either aligned in proximity or glued together or a combination of these compositions.

The reticle 16 is a circular, planar or flat transparent panel or disk mounted within the housing 11 in perpendicular relationship to the optical axis or line-of-sight 18 through the scope, and is positioned between the objective lens element 13 and the erector lens element 15, typically at a site considered to be a front focal plane of the optical system within the housing. The reticle 16 contains fine etched lines or hairline indicia comprising a center vertical hairline 19 and a center horizontal hairline 20, which orthogonally or perpendicularly intersect at a center point 26. The reticle further defines first, second, third and fourth horizontal range and aiming marker hairlines 21, 22, 23 and 24 (or other designs as may be appropriate to specific applications) respectively intersecting the vertical hairline below the center point 26 and vertically spaced apart and of sequentially increasing length. Each such range and aiming marker hairline 21, 22, 23, and 24 is bisected by the center vertical hairline 19, in the present design in a horizontal manner but potentially in an angled manner as necessary to account to the vertical component of wind drift, etc.).

We must also note that it is feasible to present a virtual reticle into the sighting system by other means, chiefly electronically, and that the absence of a physical reticle in no way alters the functionality of the present invention; therefore, any means of generating aiming points that achieves the same goal as that described herein is fundamentally identical in nature and is also claimed.

Figure 12:
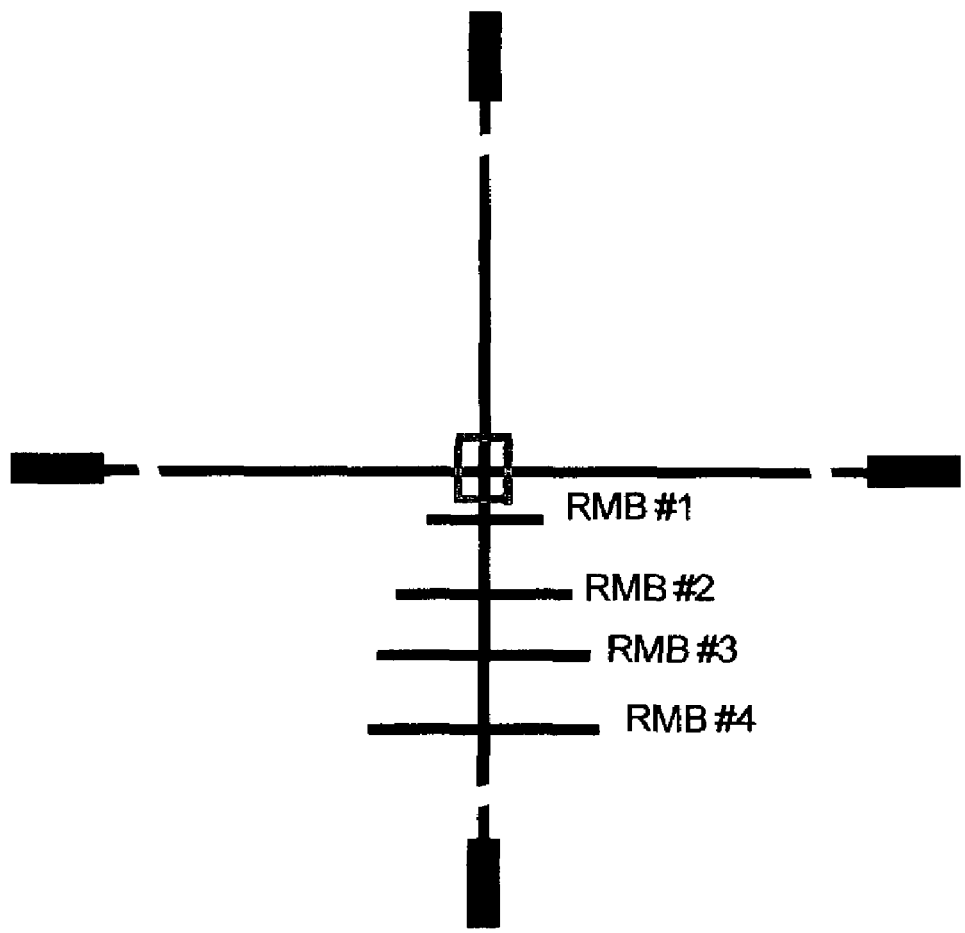
FIG. 12 illustrates the reticle depicted in the form of a decal for taping upon the objective extremity of the scope or some other handy location. The left-hand Grid Line column serves as a reminder to denote the actual number of lines with which to divide into the animal's or target's outline for height measurement. When determining distance to target, the upper right column, Aiming Point at level angle, denotes bullet impact point for a "6 Factor" gun zeroed or sighted-in at 200 yards. Using the grid-line center point, at 100 yards the bullet impact will be 1.84 inches (about 2 inches) high, and at 200 yards the impact point will be on target (zeroed) —200 yards is a typical "zeroing" range for such a gun and load. At 300 through 600 yards the lower indicia (crosshairs) provide a precise impact point. The upper center column, Aiming Point Grid Line at 45 degree Angle, denotes the angle correction when shooting uphill or downhill. For a "6 Factor" gun, simply move up the equivalent of one crosshair (about 2" on angle subtention) for a 45° angle shot.
Figure 13:
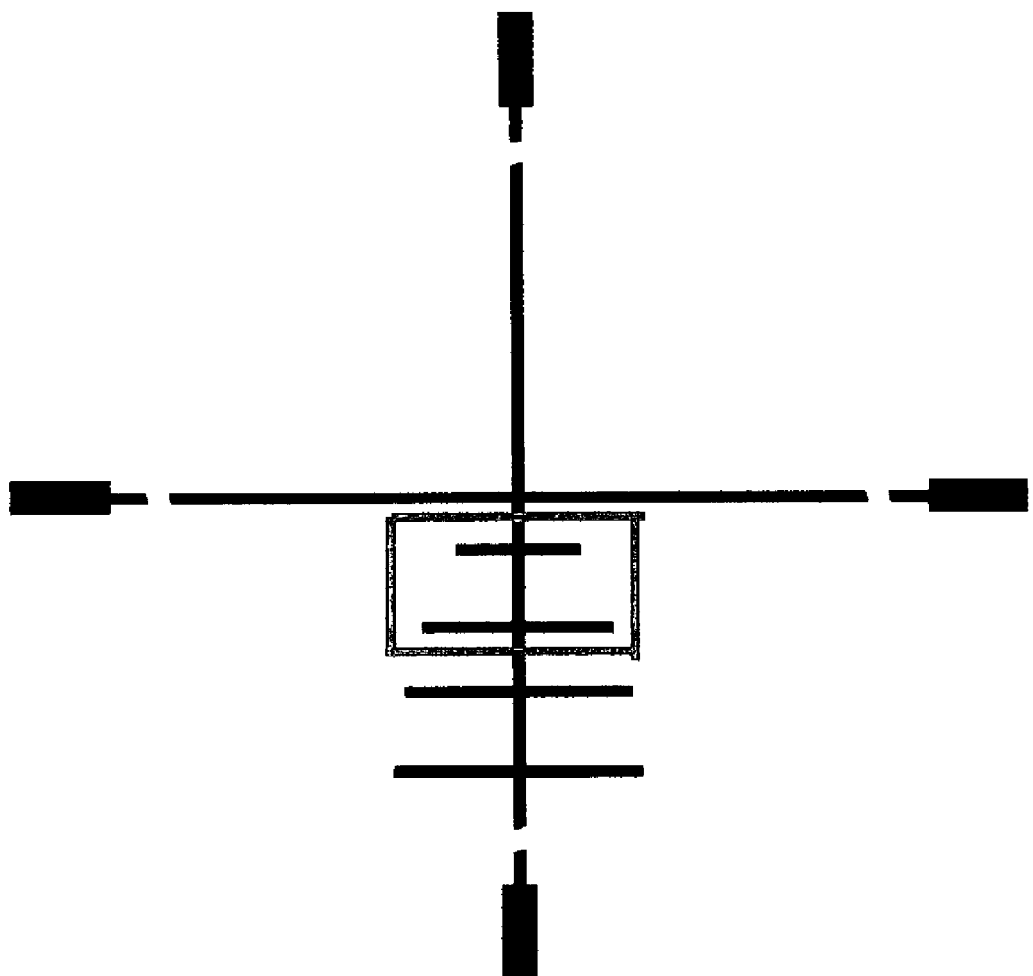
FIG. 13 shows a reticle depicted in the form of a decal, highlighting the first two marker lines and illustrating another energy maneuverability level of the aiming system.
Figure 14:
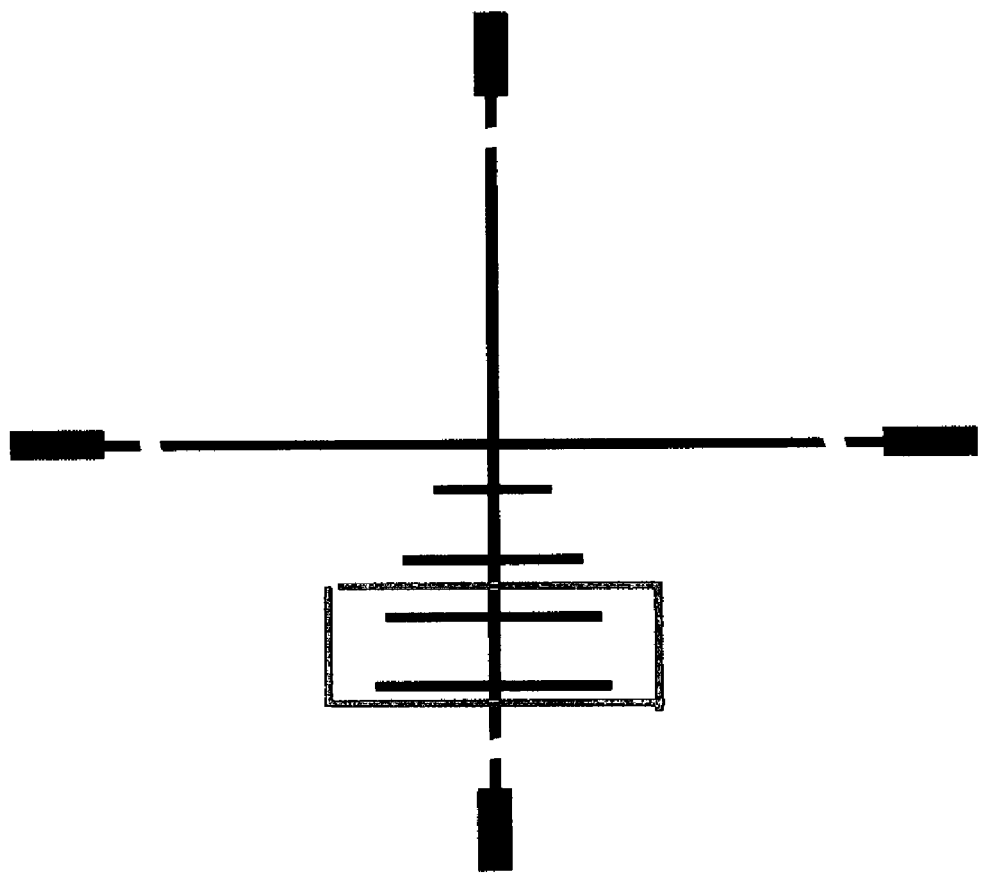
FIG. 14 shows a reticle depicted in the form of a decal, highlighting the third and fourth marker lines and illustrating vet another energy maneuverability level of the aiming system.
Figure 15:
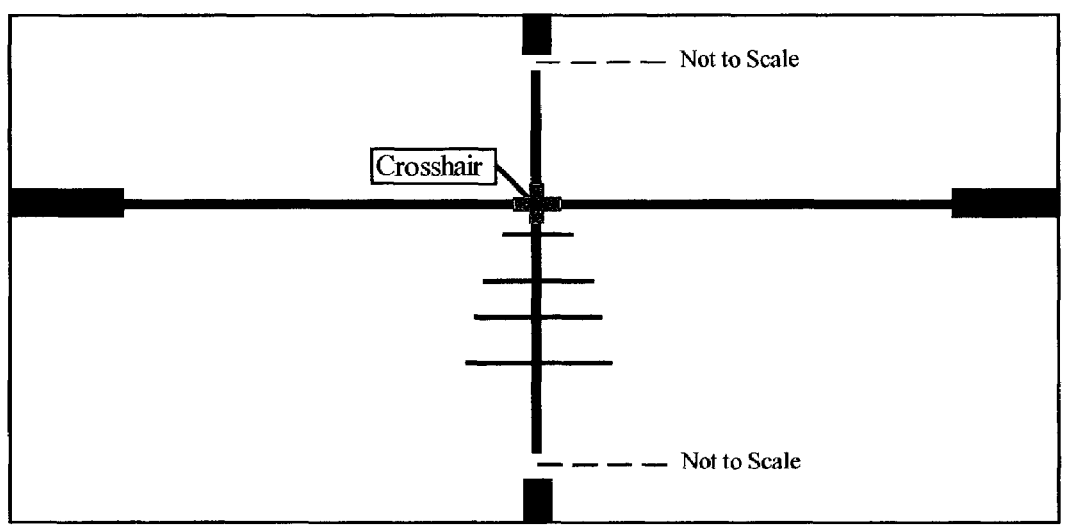
FIGS. 15 and 17 provide additional description of the aiming reticle of the present invention and methods of using, illustrating a point blank aiming system.
Figure 16:
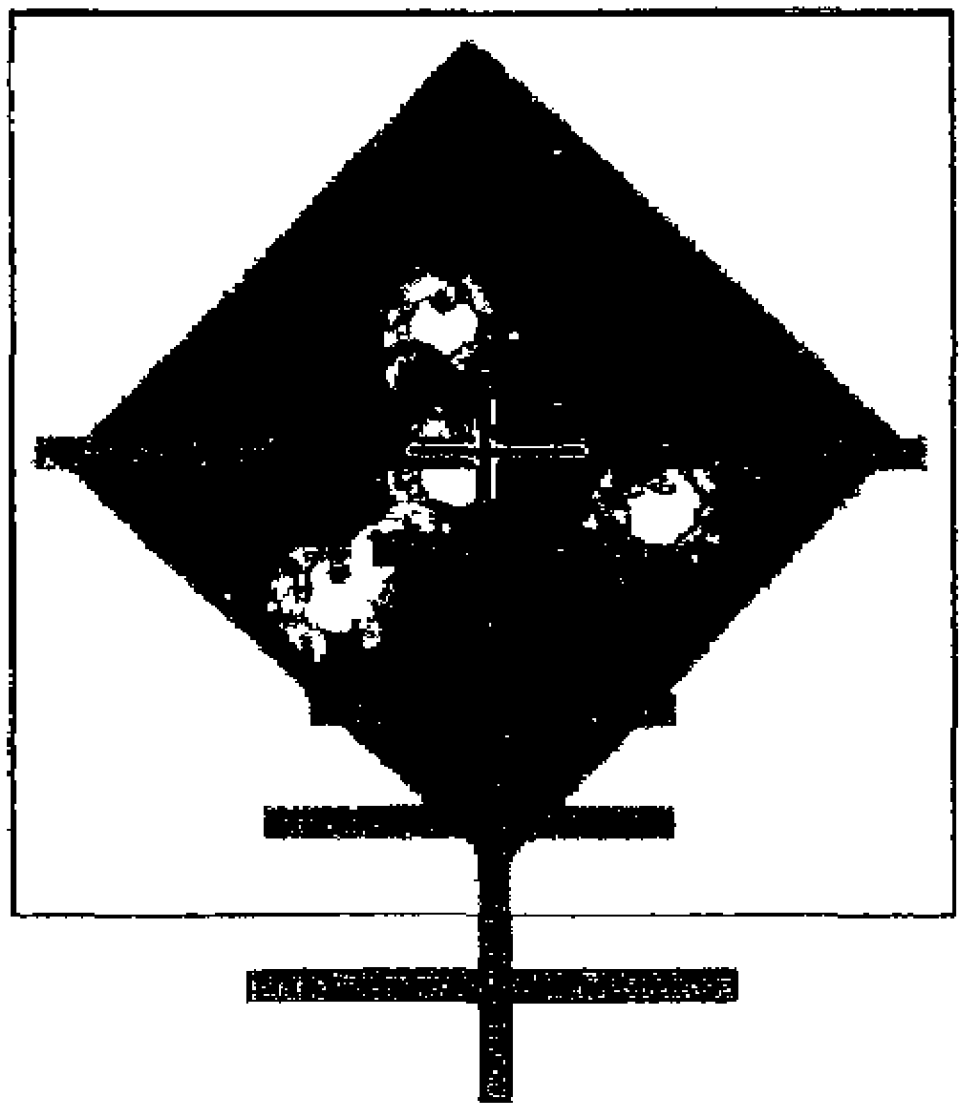
FIGS. 16, 18 and 19 illustrate a reticle crosshair of a target at varying distances.
Figure 17:
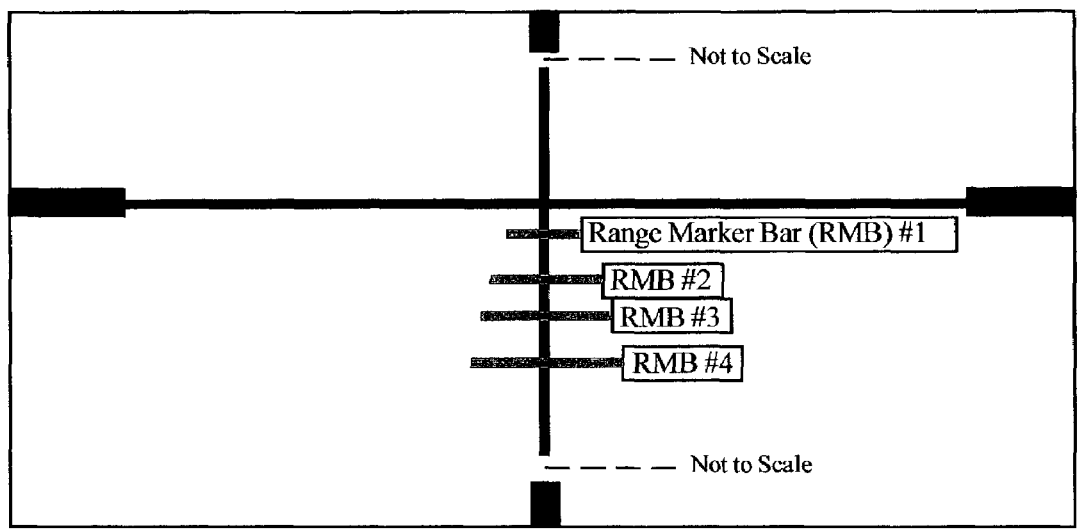
Figure 18:
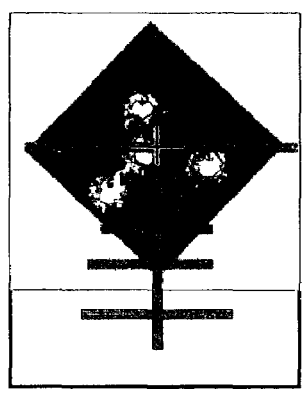
Figure 19:
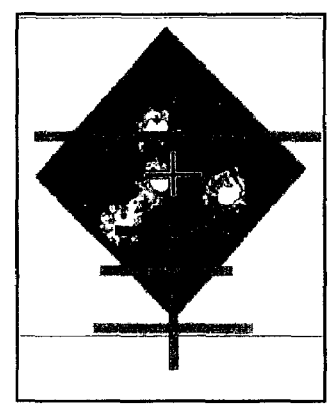
Figure 20:
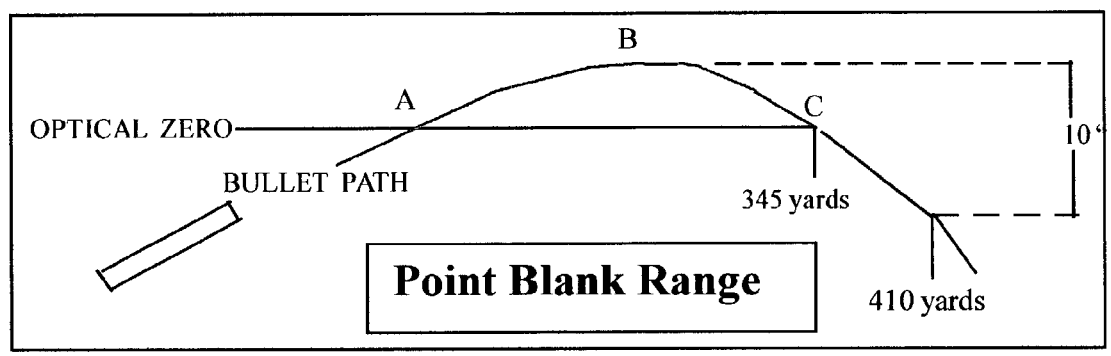
FIG. 20 is a schematic illustration of the path of a bullet.
Figure 21:
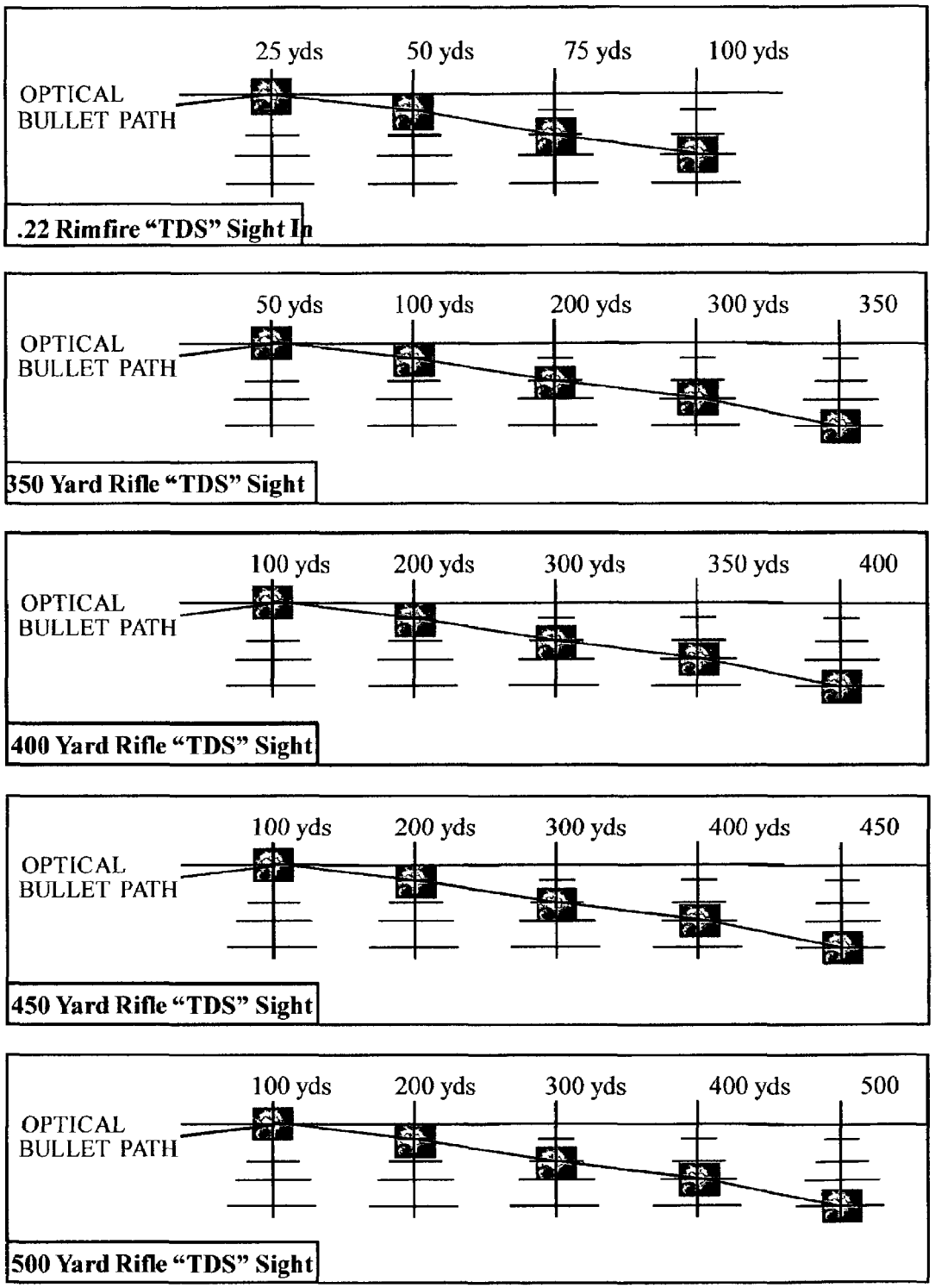
FIGS. 21-22 schematically illustrate the five common bullet paths for different gun and bullet combinations.
Figure 22:
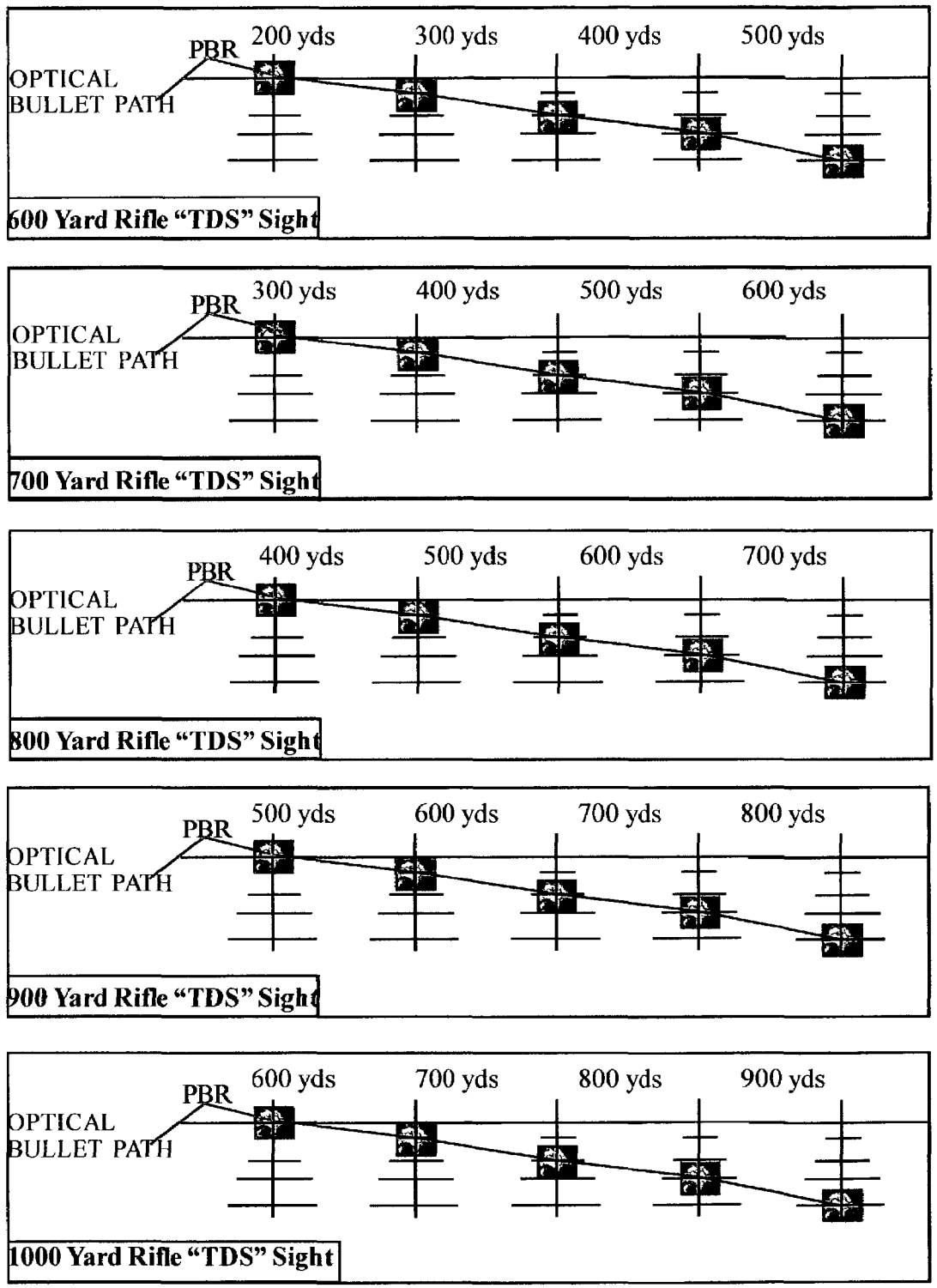
Figure 23:
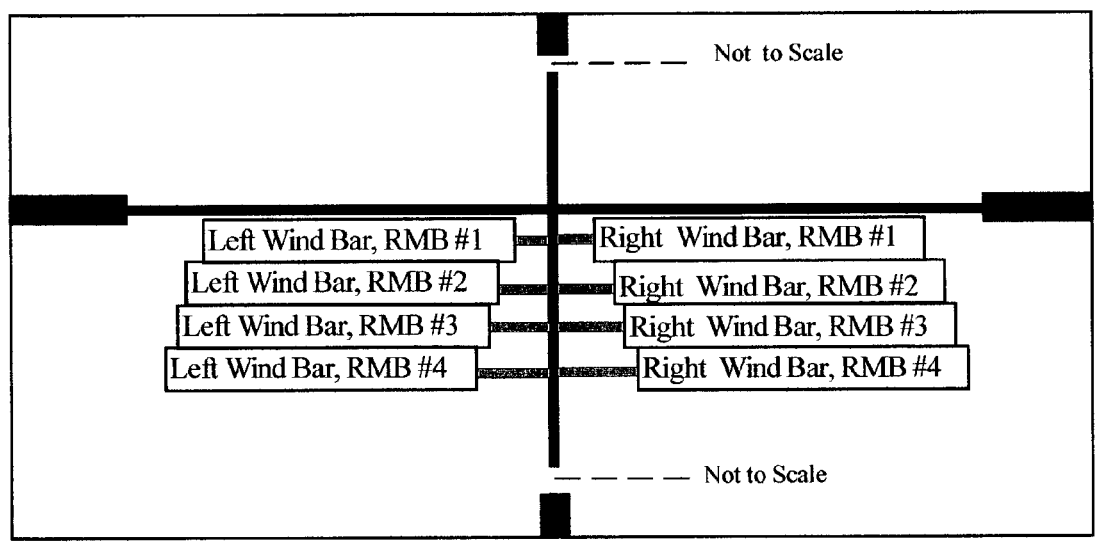
FIG. 23 illustrates use of a reticle to compensate for crosswind.
Figure 25:
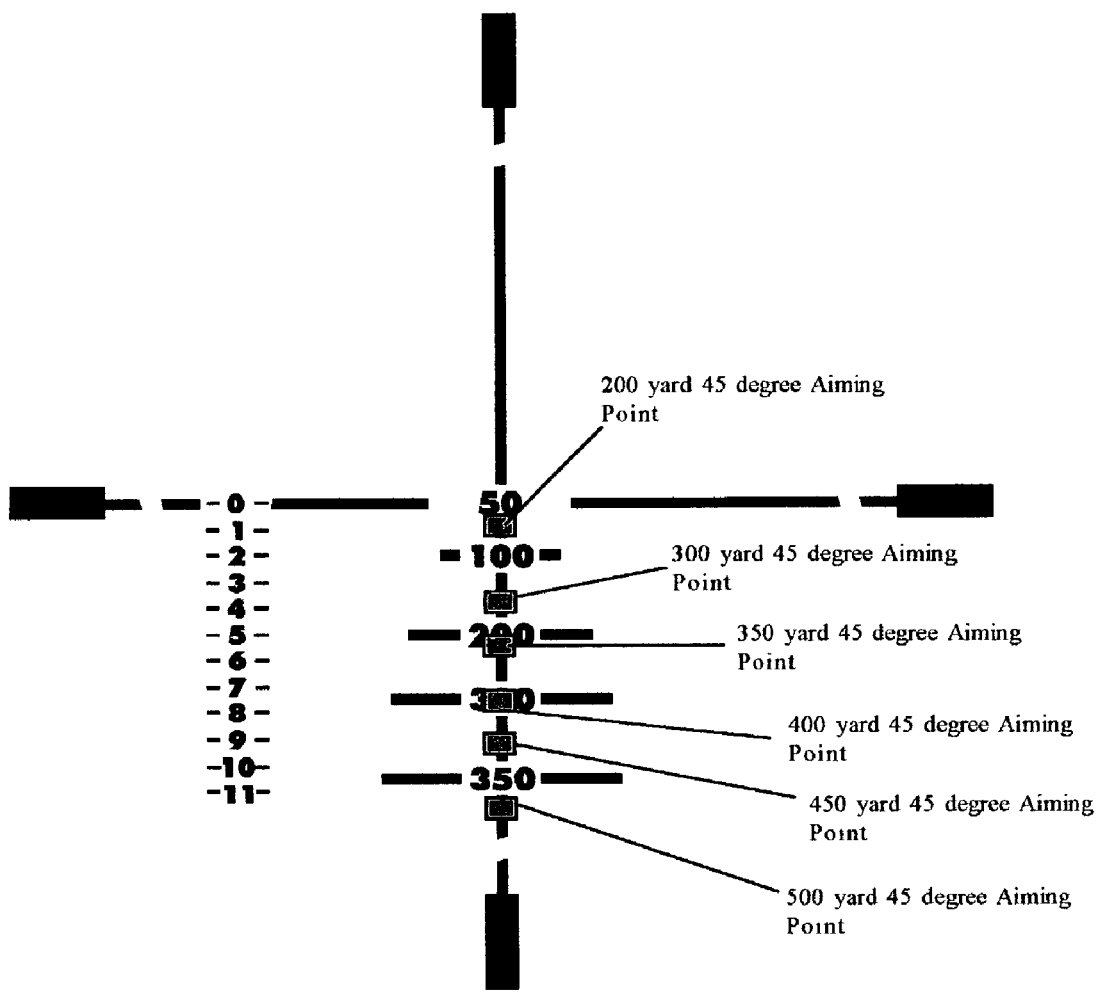
FIG. 25 is an example decal provided with high and low angle aiming points adjusted for the lessened gravity drop of an angle shot.

Each combination of a gun and bullet or cartridge must be initially sighted in at 200 yards, or other selected basic zero range, which depends critically upon the ballistic characteristics of the specific bullet (refer to FIG. 12). The center point 26 then represents the basic sighted-in bullet impact point. The points of intersection of said first, second, third and fourth range marker lines 21, 22, 23, and 24 with said vertical hairline, designated first, second, third and fourth alternative aiming points 30, 31, 32 and 33, respectively, represent sighted-in bullet impact points at distances that are a function of bullet trajectory for the specific load used. For example, for a bullet and gun determined to be a "6 factor" system, as will be explained, the aiming points are for distances of 300, 400, 500 and 600 yards, respectively.

A "6-factor" gun and bullet combination is a system that produces a 6 inch drop from a "sight-in" impact zero point at 200 yards to the bullet impact point when the same combination of gun, bullet and scope adjustment settings is fired at 300 yards, using the center point 26 as the aiming point. Bullets of different characteristics and velocity (different gun and bullet combinations) will produce different "factors." Thus the aiming points 30, 31, 32 and 33 will correspond to different distances or ranges, which the shooter, knowing the characteristics of the bullet, will take into consideration when aiming and firing.

The aiming points 30, 31, 32 and 33 are useful because the trajectory curves of different bullets are similar, even though the bullets travel different distances—some similar-length section of each curve, whether closer to the gun or further from the gun, will have a sufficiently similar shape to allow accurate use of this system (refer to FIG. 12).

The radially outer or distal portions of the center vertical hairline 19 and center horizontal hairline 20 are widened to form relatively wider or heavy posts 25 whose radially directed innermost extremities 28 are disposed on a circular locus about the center point 26. However, this is not a design limitation of this system, the main horizontal and vertical crosshairs can be of any particular design, as might be necessary to provide the best performance in any particular application and could even be partially or fully absent as when only a central dot is used.

The various dimensions and spacings of the indicia on the reticle 16 are conveniently expressed as inches of subtention or angle at 100 yards, rather than the actual engraved dimensions on the reticle lens itself. Accordingly, the width of each of the posts 25 is 5.5 inches of subtention, and the width of the hairline portions of the center vertical and center horizontal hairlines 19 and 20, respectively, is 0.6 inches of subtention. The distance between the center point 26 and the innermost extremities 28 of the posts 25, that is the length of the center vertical and horizontal hairlines 19, 20, respectively, is 25 inches of subtention. However, it must be noted that these specific dimensions and ratios of dimensions are not the only possible useful designs. The important issue is usefulness in the specific application.

The distances or width of the separation between the horizontal hairline 20 and the first, second, third and fourth range lines 21, 22, 23, and 24 below the center point 26 are 2.0, 4.8, 7.5 and 10.5 inches of subtention, respectively—but other designs are feasible for other applications. Typically four, marker lines are typically of equal 0.3 inch width of subtention and are typically straight and orthogonally or perpendicularly bisected by the lower half or lower portion of the center vertical hairline 19; however, other line thicknesses and non-orthogonal intersections with the vertical line are feasible and may be preferable in some applications. When four such lines are used, the lengths of the first, second, third and fourth range marker lines are 4.12, 5.90, 8.32 and 9.72 inches of subtention, respectively; however, other lengths are feasible and may be preferable in some applications—the lengths specified above correspond to required corrections for a 10 mile per hour true crosswind component, which is a wind speed to which many experienced shooters can recognize and relate.

The foregoing dimensions are empirically derived and are critical to the accuracy and ease of use of this system in the standard application (such as a hunting rifle)—these datum are fundamental to the concept. However, one can also envision more complex systems that might be used for other applications wherein the extended range elevation aiming lines might be thinner, longer and include enlarged "dots" at specific intervals to indicate corrections for various true crosswind velocities such as 5, 10, 15 and 20 miles per hour, etc. Moreover, for other applications, this basic concept could be extended to include designs having more than four range marker bars. No such application and embodiment should be considered to fall outside the basic tenants of this concept and therefore, this application is not limited to the specific design described herein; rather, this concept should be understood to cover any application wherein the spacings and lengths of the range lines incorporate the required characteristics so as to correspond to the parabolic nature of a projectile trajectory at any specific incremental (or other useful) range interval and wind condition. The central point of this art is that it uniquely recognizes the parabolic drop and crosswind deflections characteristics of real projectiles.

As noted elsewhere, in the particular embodiment described herein, the "factor" for a particular gun and bullet combination is determined by sighting it in at 200 yards using the center point of the reticle. Using the same 200 yard sight center point, a group of shots is then fired at 300 yards and average drop (in inches) is measured. This figure becomes the "factor" that is used to compute vertical bullet drop, wind drift deflection, both horizontally and vertically, and gravity correction for both uphill and downhill angle correction for that particular gun and loading.

Bullet drop is progressively curvilinear (following a parabolic curve), and is well predictable out to about 0.72 seconds of free flight (450 yards for a 0.308 Winchester; 500 yards for a 30/06; 600 yards for a 7 mm Remington Magnum; and 700 yards for a 30/378; all when used with high energy maneuverability bullets—traditionally known as bullets having a streamlined shape and a relatively high ballistic coefficient). Bullet drop for a 6-factor gun and bullet combination for example, results in a 6-inch drop at 300 yards. This factor is tripled to predict 400-yard bullet drop. This 400-yard drop is doubled to predict 500 yard drop. For 600-yard drop, the 500 yard drop is doubled and ten (inches) is subtracted from that result. This corresponds to a formula used to determine the spacing of these indicia.

For instance, a 6-factor bullet (150 grain 7 mm. Remington Magnum fired at 3,200 fps) computes thusly:
 a. 300 yard drop: 6"
 b. 400 yard drop: 3×6=18"
 c. 500 yard drop: 18×2=36"
 d. 600 yard drop: 36×2=72−10=62"

In other words, for a 6-factor gun and bullet that is zeroed at 200 yards, the bullet drops 6"@300 yards, 18"@400 yards, 36"@500 yards, and 62"@600 yards. Other specific formula and extensions to longer times of flight are feasible so long as those describe useful characteristics of real projectiles.

A reticle embodying the present invention having the above characteristics and dimensions, will produce sufficiently accurate shots when using the respective reticle aiming points at the determined distances. For gun and bullet combinations that have a factor other than six, center impact distances corresponding to the various aiming points must be calculated accordingly. See Table I.

It is a useful fact that variable magnification scopes (commonly referred to as variable power scopes) with the reticle positioned in the first focal plane (in this design, adjusting the power setting of the scope also adjusts the absolute apparent spacing between the range indicia) can be used to automatically adjust the described reticle, as required to provide to correct holdover for practically any "factor" gun and load by the simple expedient of adjusting the power setting to the required value, so as to generate the correct spacing of the indicia. In some applications, it might be necessary to alter the basic zero range and range increment but such correspondence will always be feasible.

Figure 4A:
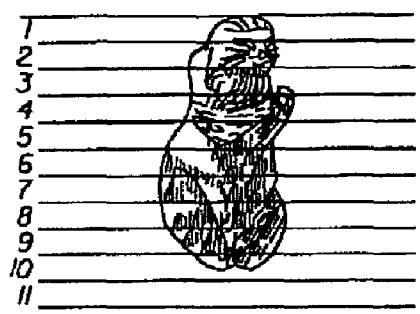
FIGS. 4A, 4B and 4C illustrate the use of calibration grids for learning the use of the scope of this invention.
Figure 4B:
Figure 4C:
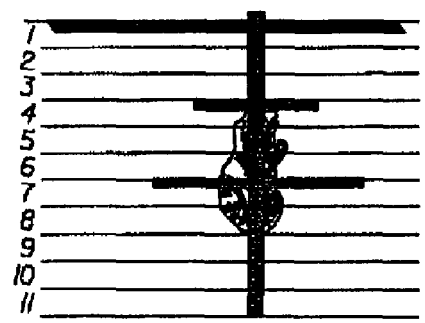

Use of a scope utilizing this invention for measuring target distance may best be visualized by referring to the grid line charts as shown in FIGS. 4A, 4B and 4C. Each grid line chart consists of a series of numbered horizontal straight lines sequentially spaced an inch apart (inch of subtention at 100 yards or approximately one minute of angle) and assumed to be visibly distinct in the scope at the indicated ranges. A target such as a 9-inch tall prairie dog is drawn to occupy the top nine lines of a chart, as shown in FIG. 4A, and assumed to be placed at a range of 100 yards. The scope is then sighted onto said 100 yard target, producing the view shown in FIG. 4B wherein the top of the prairie dog is placed at the center point 26, and the bottom of the prairie dog falls between the third and fourth range marker lines, namely between 7.5 and 10.5 inches of subtention from the center point 26. By interpolation, the bottom of the target, having an actual height of 9 inches, is 9 inches of subtention from the center point 26. It is accordingly ascertained that the 9-inch high prairie dog target is located at a shooting range of 100 yards.

It should be noted that the target heights subtended by the horizontal range marker lines increase in direct arithmetic proportion to the distance of the target from the gun. Therefore, at 200 yards, the first, second, third and fourth range marker lines measure targets of 4, 10, 15 and 21 inch actual heights (rounded), respectively. At 300 yards, the first, second, third and fourth range marker lines measure targets of 6, 15, 22.5 and 31.5 inch actual heights (rounded) respectively. At 400 yards, the first, second, third and fourth range marker lines measure targets of 8, 20, 30 and 42 inch actual heights (rounded) respectively.

When the same 9-inch prairie dog target is viewed for example at 300 yards, the view through the scope is as shown in FIG. 4C, wherein the target appears much smaller because of the distance at which it is located, and the range marker lines now correspond to progressive actual heights of 6, 15, 22.5 and 31.5 inches respectively in descending order down said center vertical hairline. Now, with the top of the head of the target at the center point, the bottom of the target will be located between the first and second range marker lines. This position corresponds to 3 inches actual height at 100 yards or 9 inches actual height at 300 yards. It follows, that knowing the actual height of the target, one can easily determine target range. In other words, in order to determine distance to target, target height is divided by inch reading on reticle. In the example of FIG. 4C, the 9 inch target would measure 3 inches on the reticle; accordingly, target range is 9÷3=3 (×100), or 300 yards.

Once the shooter has determined target range, and when the shooter knows the factor of the gun and bullet being used, the scope can be accurately aimed by centering the appropriate indicia along the vertical hairline upon the desired location of bullet impact. For example, with a "6-factor" gun and bullet combination, and having ascertained that the target is located at 300 yards, and knowing that the main reticle center point 26 is for a 200 yard range, the next lower aiming point, consisting of the point of intersection 30 of the vertical crosshair 19 with the first range marker 21, corresponding to 300 yards, is, under ideal conditions and with a stationary target, used as the aiming point for a direct hit.

Figure 5:
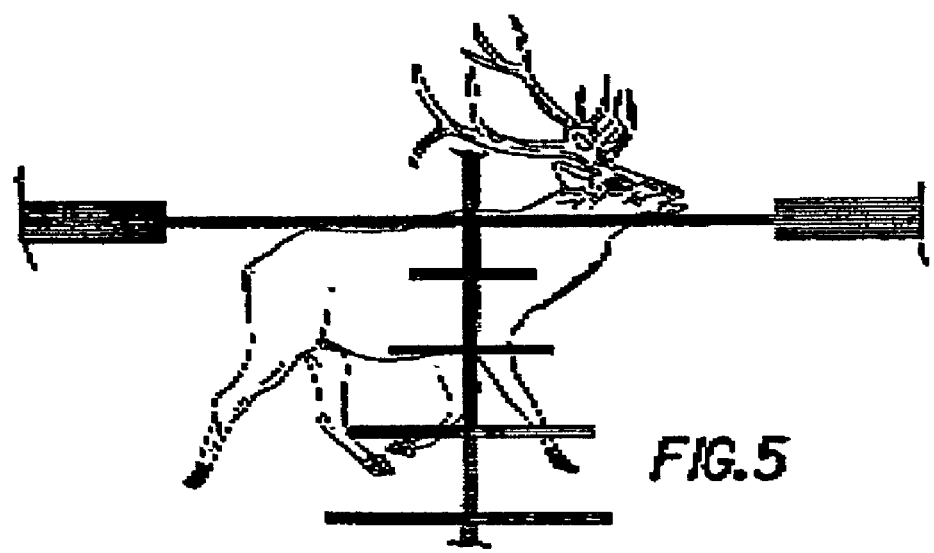
FIG. 5 illustrates the use of the scope of this invention on large targets.

Use of this reticle with respect to a Rocky Mountain Elk having an estimated 25 inch chest height is illustrated in FIG. 5. It is seen that the 25 inch chest is spanned by about 5 inches of subtention of reticle distance. Accordingly, the range is 25÷5=5 (×100), or 500 yards, and aiming point 32 is employed for shooting, centered upon target, again this assumes a "6-factor" gun and bullet combination, ideal conditions and a stationary target.

Compensation must be made for bullet deflection due to wind drift. To this end, the gun must be pointed into the wind. This is accomplished by moving the reticle aiming point in the opposite direction an appropriate amount. For this purpose, the applicable "factor" becomes the 10 mph wind correction or drift, applied in a linear manner.
 a. at 300 yards the drift is 6";
 b. at 400 yards the drift is 6+6=12";
 c. at 500 yards the drift is 12+6=18";
 d. at 600 yards the drift is 18+6=24".

For a 5 mph wind, the drift values would be one-half the 10 mph values, and a 20 mph wind would require twice the 10 mph values and similarly for other true crosswind velocities.

Figure 6A:
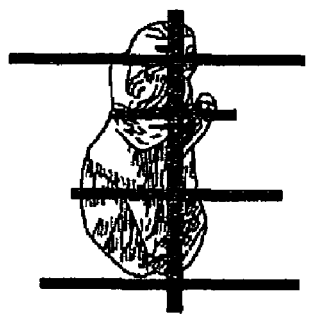
FIGS. 6A and 6B illustrate the use of the scope of this invention on a small target.
Figure 6B:
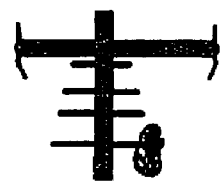
Figures 7, 8, 9:
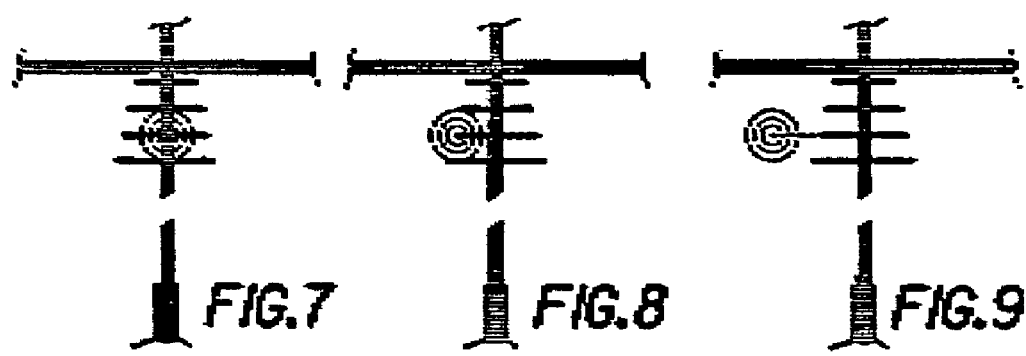
FIGS. 7-11 exemplify sighting images perceived by the shooter in various shooting situations.

The sight picture for shooting at a 9-inch high prairie dog at 100 yards is illustrated in FIG. 6A. The sight picture for shooting at a 9-inch high prairie dog at 600 yards with a 10 mph left crosswind is illustrated in FIG. 6B. The view through the scope when shooting at a target at 500 yards is illustrated in FIG. 7. FIGS. 8 and 9 illustrate adjusted aiming points to compensate for 10 mph and 20 mph right-to-left crosswinds, respectively. For this purpose, the ends of the range marker lines, having the above lengths, constitute aiming points to compensate for 10 mph winds at the respective ranges. Length of the range marker bars on each side of the vertical centerline are one half the total length or 2.06, 2.95, 4.16 and 4.86 inches of subtention at 100 yards respectively.

Compensation must also be made for the effect on the path of the bullet of the spinning thereof. The rifleman's idiom designates this as a "Magnus effect." It may also be referred to as "Yaw of Repose." these are the vertical and horizontal elements of deflection in a crosswind when considering a gyroscopically spinning projectile or missile.

Figures 10, 11:
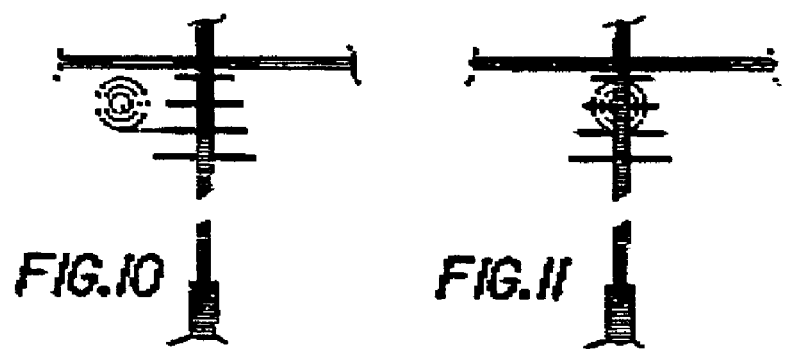

The formula for compensating for the potential worst case effect of Magnus is to adjust ¼th the total value by sliding that point onto the target. In the illustration of FIG. 10, there is shown the aiming point as an interpolated point left one equal wind bar (10 mph) and ¼ above the left tip of the third range marker line. (Unusually low-drag high-speed bullets may react to Magnus only a small percentage of the adjustment in FIG. 10; however, hunting bullets do not fall into this category.) The rule is to construct a "kill zone" on the target and then hold "worst and best" Magnus movement so that the bullet is aimed with sufficient accuracy to intersect the kill zone.

Computing simultaneous Magnus and Yaw of Repose values and crosswind values:

1. With conventional (right-hand) twist barrels, these effect make the bullet rise with a right-to-left crosswind, drop with a left-to-right crosswind.

2. Add ¼th the horizontal value vertically to the final aiming point using the reticle wind bar as a transparency overlay.

As noted previously, it is also possible to incorporate automatic vertical-component crosswind correction into the range markers by aligning those at a slight angle to the horizontal so that the sighting correction for a crosswind automatically incorporates the required correction for the vertical component of wind drift. While not embodied in the accompanying sketches, this method is claimed and recognized as a logical extension and improvement on the basic concept of this reticle design. It is recognized that this method would require separate scopes for guns with reverse rifling twist directions and for guns used in the southern hemisphere and might require special angles for guns used at certain locations. However, for the vast majority of hunting gun applications, one basic correction angle would suffice to provide sufficient accuracy of correction as to achieve the required shot placement accuracy.

When shooting uphill or downhill, bullet impact point will be higher than when shooting level at the same total target distance. In other words, when computing uphill or downhill gravity values, it must be noted that angle shots require less hold-over, that is the aiming point is moved upwardly on the reticle, because of a lesser gravity pull although bullet drag remains the same. A sight picture and aiming point for a "6-factor" gun and bullet at a 45° up-hill shot at 500 yards slant range is illustrated in FIG. 11. The appropriate sighting adjustment in such situation is to move up one range marker line for a 45 degree angle, twice that or two range marker lines for a 60 degree angle, and one half that or up one-half the distance between appropriate range marker lines for a 30 degree angle.

The formula or adjustment for a 60° angle shot, for example, is as follows:

a. at 200 yards, raise the aiming point an amount equal to ⅔rds of the factor, or 4";
b. at 300 yards, double the 200-yard value, or 8";
c. at 400 yards, double the 300-yard value, or 16";
d. at 500 yards; double the 400-yard value, or 32".

The reticle of the present invention performs with each gun and bullet with the same precise degree of accuracy. The shooter is thus provided a similar but unique reticle decal for each combination. It must be stressed that the associated decals are an integral part of this system and as such, the concept of application specific decals is also part of this art.

While a single reticle constructed as described above may be used for most gun and bullet combinations, specialized reticles may be needed for certain particular gun and bullet or cartridge combinations, scope magnifications and unusual applications. Therefore, the ratios of indicia spacings and lengths are not unique and other ratios of and lengths can have value for specific applications, so long as these correspond to range-finding functions, etc., as describing a parabolic trajectory, the design will be an obvious derivative of this basic concept. This is a parametric design issue and the critical factor of interest is that specific ratios of spacings and lengths are required to produce useful results.

It is further to be stressed that with this design the shooter need not divert attention from the image in the scope for first determining distance and other corrections and second for finding the proper aiming point.

A telescopic gunsight utilizing this invention is particularly well suited for shooting at moving targets. It is generally known that a deer starts running at about 12.5 mph. The distance between the reticle center point 26 and the innermost extremities 28 of the posts 25 compensates for a target moving at 12.5 mph. Further adjustments can be readily made for targets moving at other estimated speeds and angles, in direct proportion to the 12.5 mph speed adjustment.

The final sight picture provided by the reticle embodying the present invention, corrected for range, wind, external ballistics, and target movement results in a straight line aim and shot at the target in the same manner as a point blank range shot. This enables the shooter to have much more confidence in the result and therefore to more easily achieve accurate shot placement.

Using a reticle of the present invention, observing the target conditions, and applying the foregoing simple mental calculations, an aiming point on the reticle is selected and centered on the desired target impact point. This can be done quickly with less stress or doubt, when compared to other systems. The shooter can then concentrate on firing the gun in a relaxed mode with a minimum of movement or "jerk" of the gun and then "look the bullet into" the target—this is otherwise called "follow through" and has long been recognized as critical to marksmanship.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of this invention.

A final point of significant value revolves around the difference between first and second focal plane reticle placement in a variable power scope. The former design provides for a means of making any "factor" reticle design fit any "factor" application. The disadvantage of this method is that it requires use of the variable power scope only at one specific power setting for the particular application. The disadvantage of the latter method is that it requires use of a specific "factor" reticle. Each system has advantages and this art covers any and all such applications.

The invention claimed is:

1. A telescopic gun sight having an optical system comprising a forward objective lens element, a rear eyepiece lens element and an intervening erector lens element aligned along an optical axis constituting a line of sight and protectively confined within an elongated tubular housing adapted to be securely affixed to a gun for shooting a bullet at a target, a transparent reticle in said optical system between said objective and erector lens elements, said reticle having distance-measuring and aiming indicia thereon, said indicia comprising a center vertical straight hairline and a center horizontal straight hairline, said center vertical and center horizontal hairlines intersecting perpendicularly, and four substantially straight horizontal range-marker hairlines of sequentially increasing incremental lengths disposed below said center horizontal hairline and substantially parallel thereto and in vertically bisected relationship with said center vertical hairline, the vertical spacing of said range-marker hairlines below said center horizontal hairline being non-evenly spaced and proportional to the drop of said bullet at regularly increased target ranges, as described by the parabolic flight of real projectiles fired in any gravitational field, wherein the spacing of said range marker hairlines below said horizontal center hairline are about 2.0, 4.8, 7.5, and 10.5 inches of subtention at 100 yards respectively but where other spacing ratios can be applied to specific other types of guns and loads for special or unique situations.

2. A telescopic gun sight having an optical system comprising a forward objective lens element, a rear eyepiece lens element and an intervening erector lens element aligned along an optical axis constituting a line of sight and protectively confined within an elongated tubular housing adapted to be securely affixed to a gun for shooting a bullet at a target, a transparent reticle in said optical system between said objective and erector lens elements, said reticle having distance-measuring and aiming indicia thereon, said indicia comprising a center vertical straight hairline and a center horizontal straight hairline, said center vertical and center horizontal hairlines intersecting perpendicularly, and four substantially straight horizontal range-marker hairlines of sequentially increasing incremental lengths disposed below said center horizontal hairline and substantially parallel thereto and in vertically bisected relationship with said center vertical hairline, the vertical spacing of said range-marker hairlines below said center horizontal hairline being non-evenly spaced and proportional to the drop of said bullet at regularly increased target ranges, as described by the parabolic flight of real projectiles fired in any gravitational field, wherein said target ranges are about 300 yards, 400 yards, 500 yards and 600 yards respectively but where other incremental ranges are appropriate for other types of guns and loads, and wherein the lengths of said range marker hairlines on either side of the center vertical hairline are about 2.06, 2.95, 4.16 and 4.86 inches of subtention at 100 yards respectively but where other lengths can be used for specific other applications.

3. A telescopic gun sight having an optical system comprising a forward objective lens element, a rear eyepiece lens element and an intervening erector lens element aligned along an optical axis constituting a line of sight and protectively confined within an elongated tubular housing adapted to be securely affixed to a gun for shooting a bullet at a target, a transparent reticle in said optical system between said objective and erector lens elements, said reticle having distance-measuring and aiming indicia thereon, said indicia comprising a center vertical straight hairline and a center horizontal straight hairline, said center vertical and center horizontal hairlines intersecting perpendicularly, and four substantially straight horizontal range-marker hairlines of sequentially increasing incremental lengths disposed below said center horizontal hairline and substantially parallel thereto and in vertically bisected relationship with said center vertical hairline, the vertical spacing of said range-marker hairlines below said center horizontal hairline being non-evenly spaced and proportional to the drop of said bullet at regularly increased target ranges, as described by the parabolic flight of real projectiles fired in any gravitational field, wherein said target ranges are about 300 yards, 400 yards, 500 yards and 600 yards respectively but where other incremental ranges are appropriate for other types of guns and loads, and wherein the lengths of said range marker hairlines on either side of the center vertical hairline are specific multiples of 2.06, 2.95, 4.16 and 4.86 inches of subtention at 100 yards respectively and where specific multiples of those lengths are indicated by some means so as to indicate specific wind speed, moving target lead, or a combination of wind speed and target lead corrections.

* * * * *